(12) United States Patent
Decrop et al.

(10) Patent No.: US 11,978,444 B2
(45) Date of Patent: May 7, 2024

(54) AR (AUGMENTED REALITY) BASED SELECTIVE SOUND INCLUSION FROM THE SURROUNDING WHILE EXECUTING ANY VOICE COMMAND

(71) Applicant: International Business Machines Corporation, Armonk, NY (US)

(72) Inventors: Clement Decrop, Arlington, VA (US); Tushar Agrawal, West Fargo, ND (US); Jeremy R. Fox, Georgetown, TX (US); Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 17/102,687

(22) Filed: Nov. 24, 2020

(65) Prior Publication Data

US 2022/0165260 A1 May 26, 2022

(51) Int. Cl.
| | |
|---|---|
| *G10L 15/22* | (2006.01) |
| *G06F 3/01* | (2006.01) |
| *G10L 15/26* | (2006.01) |
| *G10L 15/30* | (2013.01) |
| *G10L 21/10* | (2013.01) |

(52) U.S. Cl.
CPC ............. *G10L 15/22* (2013.01); *G06F 3/011* (2013.01); *G10L 15/26* (2013.01); *G10L 15/30* (2013.01); *G10L 21/10* (2013.01); *G10L 2015/223* (2013.01)

(58) Field of Classification Search
CPC ......... G10L 15/22; G10L 15/26; G10L 15/30; G10L 21/10; G10L 2015/223; G06F 3/011; G06F 2203/0381; G06F 3/16
See application file for complete search history.

(56) References Cited

U.S. PATENT DOCUMENTS

| | | | |
|---|---|---|---|
| 8,223,088 B1 | 7/2012 | Gomez et al. | |
| 9,747,900 B2 | 8/2017 | Zurek et al. | |
| 10,146,355 B2 * | 12/2018 | Zaitsev | ................. G06F 3/0486 |

(Continued)

FOREIGN PATENT DOCUMENTS

| | | |
|---|---|---|
| CN | 108363556 A | 8/2018 |
| JP | 2018-084700 A | 5/2018 |

(Continued)

OTHER PUBLICATIONS

Notification of Transmittal of the International Search Report and the Written Opinion of the International Searching Authority, or the Declaration (PCT Form PCT/ISA/220), in PCT/CN2021/129740, dated Feb. 11, 2022.

(Continued)

*Primary Examiner* — Fariba Sirjani
(74) *Attorney, Agent, or Firm* — Scott S. Dobson

(57) ABSTRACT

A method, system and apparatus to generate an augmented voice command, including identifying a plurality of sounds from a respective plurality of transducers to a smart speaker device, generating a visualization of the sounds using an augmented reality device, wherein one or more of the sounds can be selected using the visualization, and generating the augmented voice command for the smart speaker device, wherein the augmented voice command comprises the one or more sounds selected using the visualization of the augmented reality device.

19 Claims, 15 Drawing Sheets

(56) References Cited

U.S. PATENT DOCUMENTS

| | | |
|---|---|---|
| 2005/0092868 A1 | 5/2005 | Katzer |
| 2005/0171664 A1* | 8/2005 | Konig ................... G10L 15/22 |
| | | 704/E15.04 |
| 2010/0174783 A1 | 7/2010 | Zarom |
| 2014/0004826 A1* | 1/2014 | Addy ..................... G10L 17/00 |
| | | 455/411 |
| 2014/0081634 A1* | 3/2014 | Forutanpour ........... G06F 40/58 |
| | | 704/235 |
| 2014/0125574 A1* | 5/2014 | Scavezze ............... G06F 21/34 |
| | | 345/156 |
| 2014/0310595 A1* | 10/2014 | Acharya ................. G06F 3/011 |
| | | 715/706 |
| 2014/0310695 A1 | 10/2014 | Acharya et al. |
| 2015/0254058 A1 | 9/2015 | Klein et al. |
| 2015/0279368 A1 | 10/2015 | Contolini et al. |
| 2015/0371664 A1* | 12/2015 | Bar-Or ..................... G06F 9/54 |
| | | 704/270.1 |
| 2017/0228036 A1* | 8/2017 | Klein ..................... G06F 3/038 |
| 2017/0249382 A1* | 8/2017 | Venkataraman ...... G06F 40/289 |
| 2018/0261223 A1 | 9/2018 | Jain et al. |
| 2019/0294409 A1* | 9/2019 | Raikar ..................... G06F 3/165 |
| 2019/0378516 A1 | 12/2019 | Kline et al. |
| 2020/0160856 A1 | 5/2020 | Kline et al. |
| 2020/0193986 A1* | 6/2020 | Joh ......................... G10L 15/30 |
| 2020/0372906 A1* | 11/2020 | Jang ...................... H04L 12/282 |

FOREIGN PATENT DOCUMENTS

| | | |
|---|---|---|
| WO | WO 2016/050724 A1 | 4/2016 |
| WO | 2020175293 A1 | 9/2020 |

OTHER PUBLICATIONS

International Search Report (ISR) (PCT Form PCT/ISA/210), in PCT/CN2021/129740, dated Feb. 11, 2022.

Written Opinion of the International Searching Authority (PCT/ISA/237), in PCT/CN2021/129740, dated Feb. 11, 2022.

J. Barnes et al., "CS Capstone Final Report: Chatbot for Load Balancer Infrastructure," Prepared for OSU Information Services, Prepared by Group 63 Nitro Chatbot, May 29, 2020, https://eecs.oregonstate.edu/project-showcase/downloaders/artifacts?id=vS69088TMIVsj3DB.

Anonymous, "Augmented Reality Interface for Visualizing and Interacting with IoT Devices," IP.com No. IPCOM000255233D, IP.com Electronic Publication Date: Sep. 11, 2018.

T.-P. Desalvo and J. Sanchez, "Augmented reality Head Mounted Display for viewing Closed Captioned and/or subtitled streams," IP.com No. IPCOM000207866D, IP.com Electronic Pub. Date: Jun. 15, 2011.

Mel, et al. "The NIST Definition of Cloud Computing". Recommendations of the National Institute of Standards and Technology. Nov. 16, 2015.

* cited by examiner

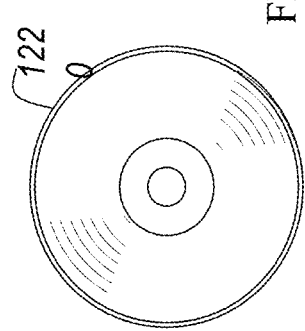
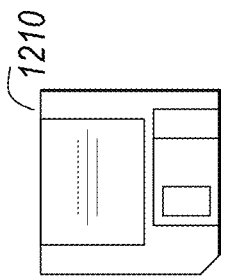
FIG. 12

AR (AUGMENTED REALITY) BASED SELECTIVE SOUND INCLUSION FROM THE SURROUNDING WHILE EXECUTING ANY VOICE COMMAND

BACKGROUND

The present invention relates to an embodiment of a method, apparatus, and system for selective sound inclusion, and more particularly, but not by way of limitation, relates to a method, apparatus, and system for AR (Augmented Reality) based selective sound inclusion from the surrounding while executing any voice command.

AI (Artificial Intelligence) Voice assistance system like AMAZON ALEXA, GOOGLE HOME, etc. are getting very popular. For example, the global voice assistance market is set to reach unprecedented levels. One of the driving forces include an increased demand for improved customer experience, and another is increased use cases in Healthcare market (patient engagement).

In such systems, a user can submit voice command, and accordingly voice command is executed.

Multiple people can submit voice command to a single AI voice assistance system, and the AI voice assistance system can recognize the voice and can execute user specific voice command.

However, there are instances when a user submits any voice command and other users in the surrounding provide further suggestions or additional feedback to the first user's voice command. When this happens, the original user may not want to accept some of the suggestions by other users in his voice command. Currently, the AI voice assistance system would not able to understand which voice command it should execute, and which can it can ignore.

Therefore, there is a need to have an AI voice assistance system that can process more complex inputs. For example, there is a need for a method and system by which user can selectively identify which spoken or non-spoken contents from the surrounding should be considered while the user is submitting voice commands.

SUMMARY

In view of the foregoing and other problems, disadvantages, and drawbacks of the aforementioned background art, an exemplary aspect of the disclosed invention provides a method, apparatus, and system for AR based selective sound inclusion from the surrounding while executing any voice command.

According to an embodiment of the present invention, a method to generate an augmented voice command, includes identifying a plurality of sounds from a respective plurality of transducers to a smart speaker device, generating a visualization of the sounds using an augmented reality device, wherein one or more of the sounds can be selected using the visualization, and generating the augmented voice command for the smart speaker device, wherein the augmented voice command comprises the one or more sounds selected using the visualization of the augmented reality device.

According to another embodiment of the present invention, a system for system to generate an augmented voice command, including a memory storing computer instructions, and a processor configured to execute the computer instructions to identify a plurality of sounds from a respective plurality of transducers to a smart speaker device, generate a visualization of the sounds using an augmented reality device, wherein one or more of the sounds can be selected using the visualization, and generate the augmented voice command for the smart speaker device, wherein the augmented voice command comprises the one or more sounds selected using the visualization of the augmented reality device.

According to yet another embodiment of the present invention, computer program product comprising a computer readable storage medium having program instructions embodied therewith, includes A computer program product comprising a computer readable storage medium having program instructions embodied therewith, the program instructions readable and executable by a computer to cause the computer to perform a method, including identifying a plurality of sounds from a respective plurality of transducers to a smart speaker device, generating a visualization of the sounds using an augmented reality device. One or more of the sounds can be selected using the visualization and generating the augmented voice command for the smart speaker device, wherein the augmented voice command comprises the one or more sounds selected using the visualization of the augmented reality device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 12 illustrates a signal-bearing storage medium for storing machine-readable instructions of a program that implements the method according to the example embodiment of the present invention.

DETAILED DESCRIPTION

Figure 1:
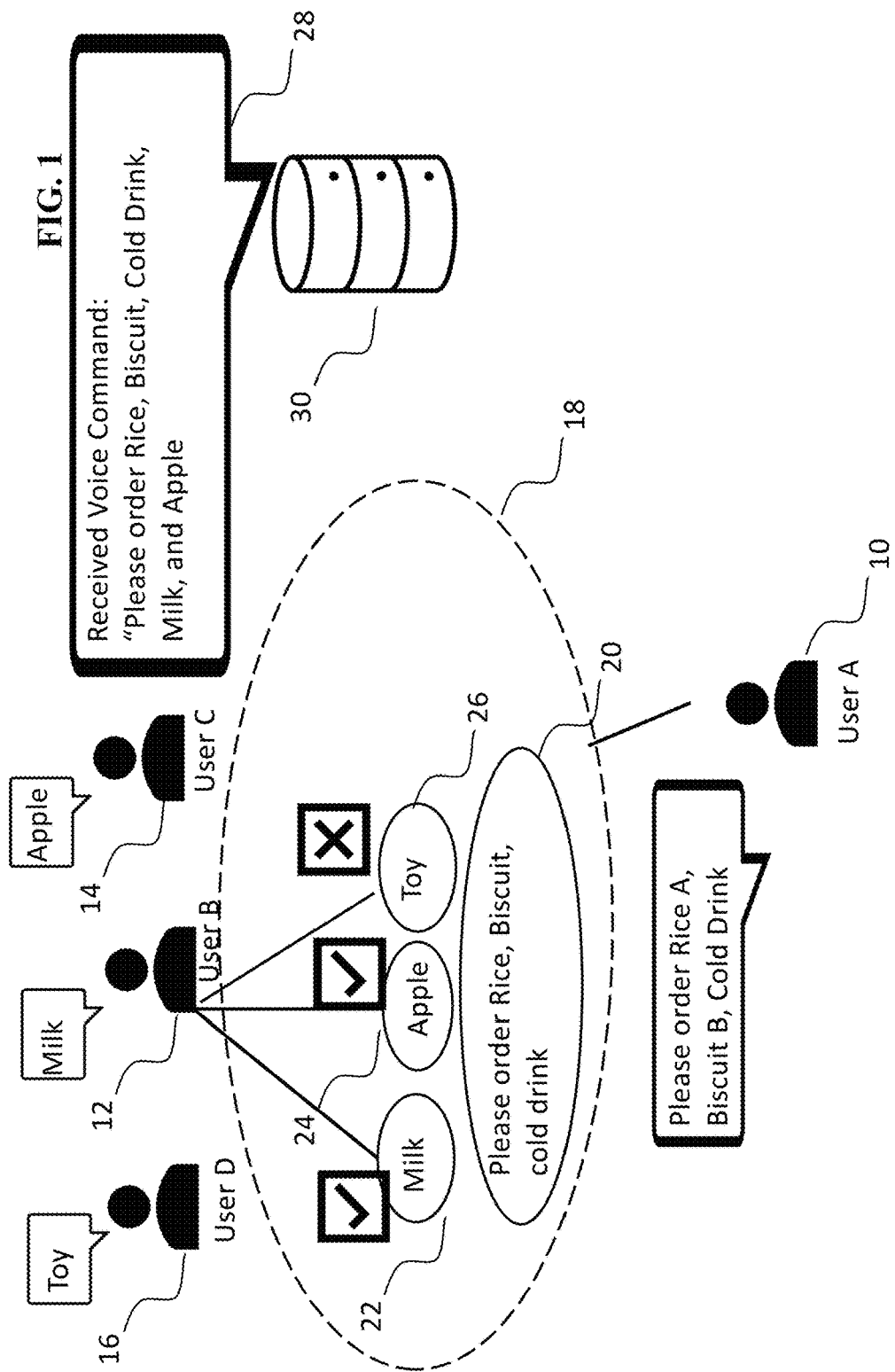
FIG. 1 illustrates a context diagram of an embodiment of the present invention.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures and embodiments shown can be modified or combined.

As mentioned above, there are instances when a user submits any voice command and other users in the surrounding provide further suggestions or additional feedback to the first user's voice command. When this happens, the original user may not want to accept some of the suggestions by other users in his voice command. Currently, the AI voice assistance system would not able to understand which voice command it should execute, and which can it can ignore. The present invention provides a solution as follows.

FIG. 1 illustrates a context diagram of an embodiment of the present invention.

The present invention provides for a method and system by which user 10 can selectively identify which spoken or non-spoken contents from the surrounding should be considered while the user is submitting his voice command.

While a user 10 is submitting a voice command and, at the same time, people (users 12, 14, 16) in the surrounding also provide additional suggestions to the voice commands. Accordingly, the user 10 can selectively include one or more sounds from the surrounding.

For example, user B 12 provides a voice prompt of "Milk", user C 14 provides a voice prompt of "Apple", and the user D 16 provides a voice prompt of "Toy". On the other hand, the main user A 10 submits a voice command of "Please order Rice A, Biscuit B, Cold Drink to the system 100".

The AI (Artificial Intelligence) voice assistance system 30 receives the voice command as "Please order Rice, Biscuit, Cold Drink, Milk, and Apple". The user by using AR glass and views the voice commands and other sounds in the AR surrounding, to select "milk" 22 and "apple" 24, while not selecting "toy" 26 in the AR selection 18, and also selecting the command of "please order rice, biscuit, and cold drink" 20 to provide the final output of "please order rice, biscuit, cold drink of milk and an apple". The toy 26 selection is removed.

Figure 2:
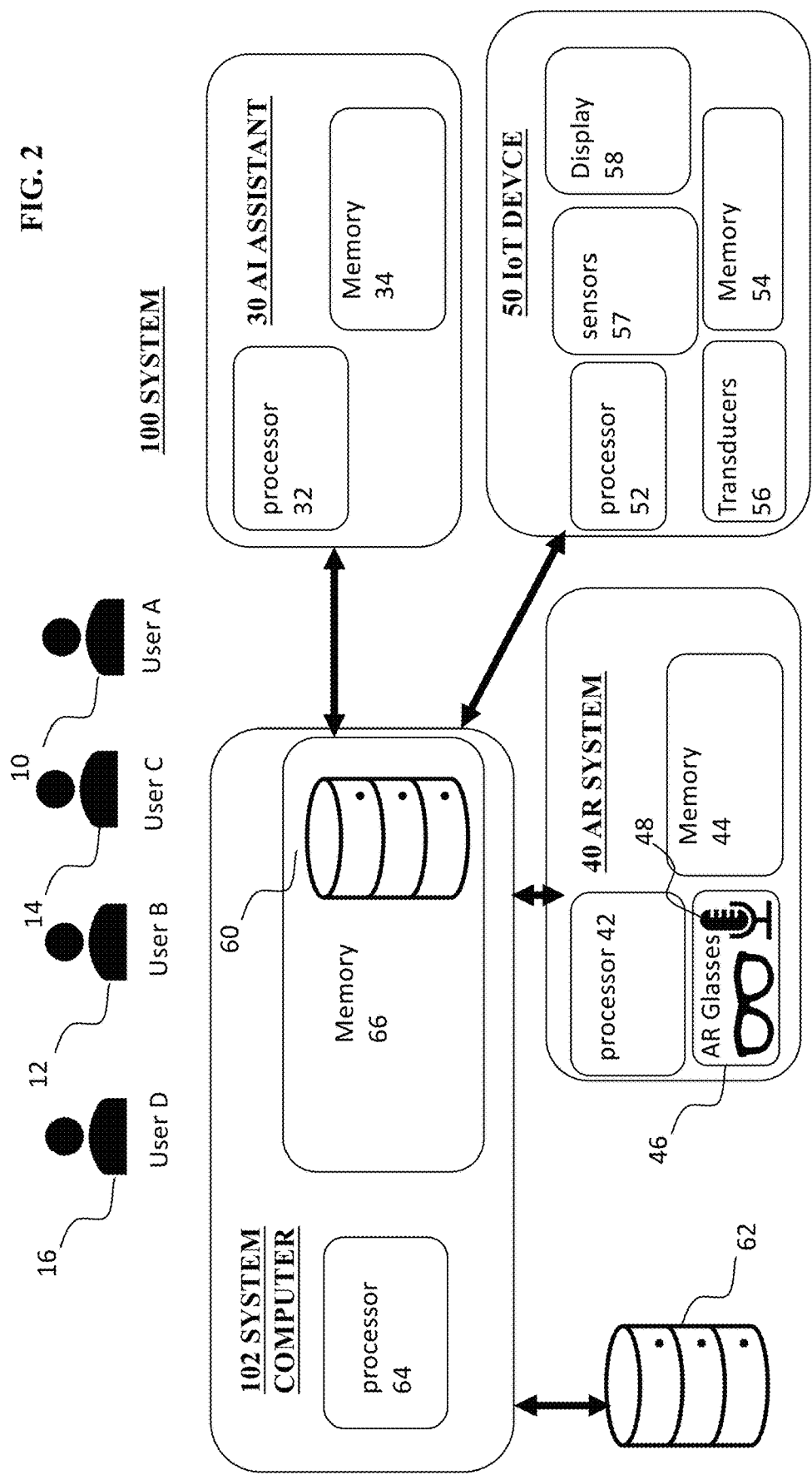
FIG. 2 illustrates the system of an embodiment of the present invention.

FIG. 2 illustrates an example system of an embodiment of the present invention. The user A 10, user B 12, user C 14, and user D 16 can communicate with the system 100 via paired devices of the AR system 40, AI assistant 30 and the IoT (Internet of Things) device 50 which will be described further below. The system 100 can include a system computer 102 that includes a processor 64 and a memory 66. A historical corpus 60 can be included in the memory 66 or the historical corpus can be separately located in a memory device 62. The AR system 40 also includes a processor 42 with memory 44, while AI assistant 30 includes processor 32 with memory 34. A plurality of IoT device 50 devices can be paired with the system 100. The AR system 40 can include augmented reality glasses 46 (or it can be a separate IoT device 50). The IoT devices 50 can include a processor 52 with a memory 54, and transducers 56 such as microphones and speakers. The IoT devices 50 can be a plurality of devices, each also including a display 58, and a plurality of sensors 57. The sensors 57 can, for example, detect biometric data or other information such as in a smart watch, or other device.

Alternative embodiments can include that any one or all of the following systems of AR system 40 and AI Assistant 30 can be incorporated into the system computer 102. Additionally, the AR glasses 46 can be a separate IoT device 50 that is paired with the AR system 40.

Figure 3:
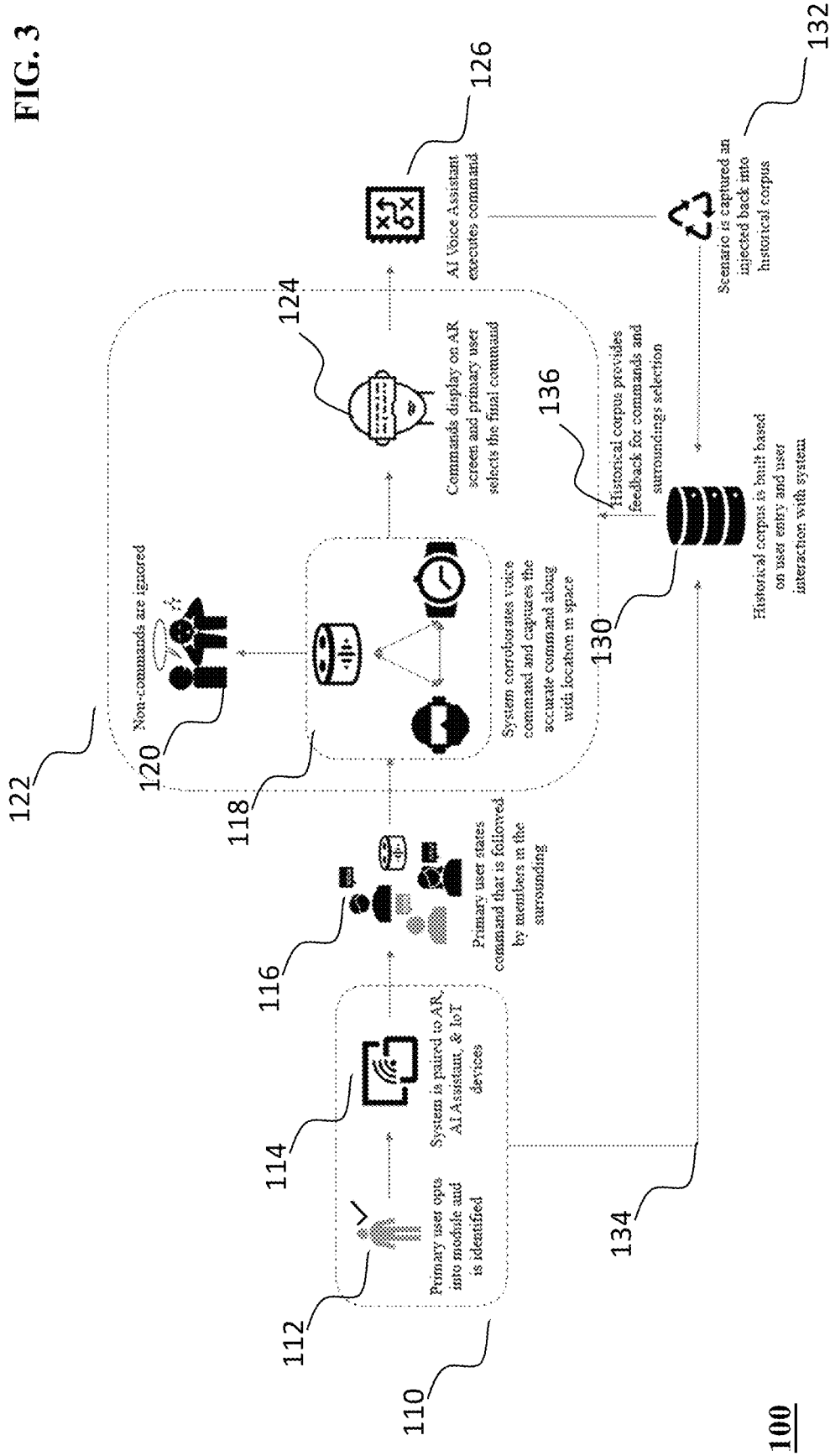
FIG. 3 illustrates a process flow/workflow diagram of an embodiment of the present invention.

FIG. 3 illustrates a process flow/workflow diagram of an embodiment of the present invention. Referring to FIG. 3, with references to FIGS. 1 and 2, in the first section for pairing of devices and user identification 110, the primary user (e.g., user A 10 from FIGS. 1 and 2) opts into a module and is identified 112. The user 10 opts into the invention and a historical corpus 60, 62 of the user's 10 voice is started. The corpus 60, 62 at 130 via path 134 collects the cadence of user's commands, frequency of user commands, and the contextual analysis of user commands from the system 100.

Then, the system 100 is paired to an AR (Augmented Reality) system 40, an AI (Artificial Intelligence) assistant 30, and IoT (Internet of Things) devices 50 at 114. AI Voice assistance system 30 pairs with the Augmented Reality glass 46. The AI Voice assistance system 40 will be recognizing the user 10 based on voice signature and Augmented reality system 40 will be recognizing the user based on a retina scanning IoT Authentication.

If a user 10, 12, 14, 16 is wearing another IoT device 50, such as a smart watch, then biometrics collected from the user would be able to identify the user 10, 12, 14, 16 based on proximity to the AR system 40, AI Voice Assistant 30, and other biometric data.

The pairing can be done by any type of communication protocol such as BLUETOOTH, Wi-Fi, proprietary protocol, etc.

Then, the primary user 10 states a command that is followed by members in the surrounding 116. When any wake-up command is submitted, then the AI voice assistance system 30 will wake up and will be receive the voice command.

While the user 10 is submitting the voice command, then the AI voice assistance system 30 will remain be awake and will be receiving the voice command.

The Activation of AR Glasses 46 is as follows. Once the AI Voice Assistant 30 is awake, it will trigger the Augmented Reality glasses 46 to "wake up" and listen to other sounds (if the AR glasses 46 contains a microphone 48).

Then, the system 100 corroborates voice command and captures the accurate command along with location in space 118. While the user is submitting voice command, then the AI voice assistance system 30 will capture what other sounds are generated in the surrounding.

Figure 4:
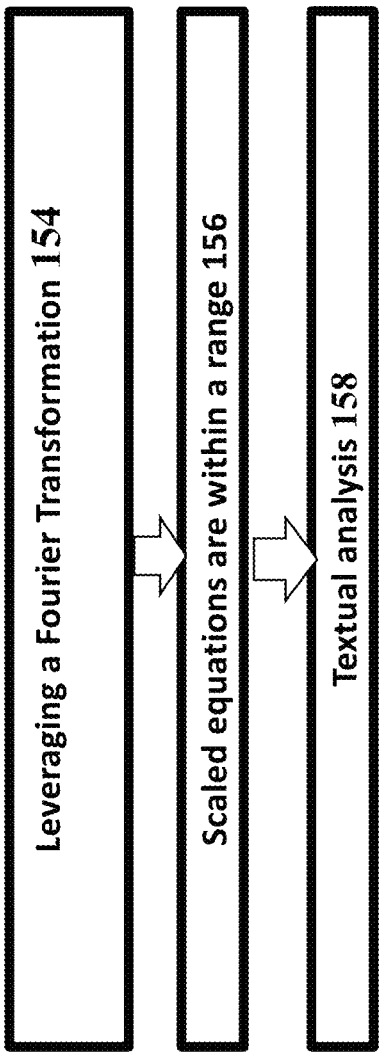
FIG. 4 illustrates the corroboration of commands by the system of FIG. 3.

FIG. 4 illustrates the corroboration of commands by the system of FIG. 3.

Referring to FIGS. 4, 3 and 2, the corroboration of Commands 118*a* is as follows. The AR system 40 (if it has a microphone 48) will be also receive the sounds from the surrounding and will corroborate that the secondary commands from the surroundings. This can be done by analyzing the difference in sound waves and making sure that they are within the same threshold Leveraging a Fourier Transformation 154, the audio file can be scaled to identify similar files:

$$f(t) = a_0 + \sum\nolimits_{m=1}^{\infty} a_m \cos\left(\frac{2\pi mt}{T}\right) + \sum\nolimits_{n=1}^{\infty} b_n \sin\left(\frac{2\pi mt}{T}\right)$$

If the scaled equations are within a defined ε>0, then the two audio waves would be corroborated 156.

Further corroboration can be done on a textual analysis 158. The command that the AI assistant system 30 registers is compared to the command from the Augmented Reality system 40. This can be done by comparing the words that each system 30, 40 detects using, e.g., a Bag of Words (BOW) algorithm to detect similarities in the commands.

IoT 50 Corroboration is as follows. Other IoT devices 50 connected to the system 100 will be able to confirm the information.

Figure 5:
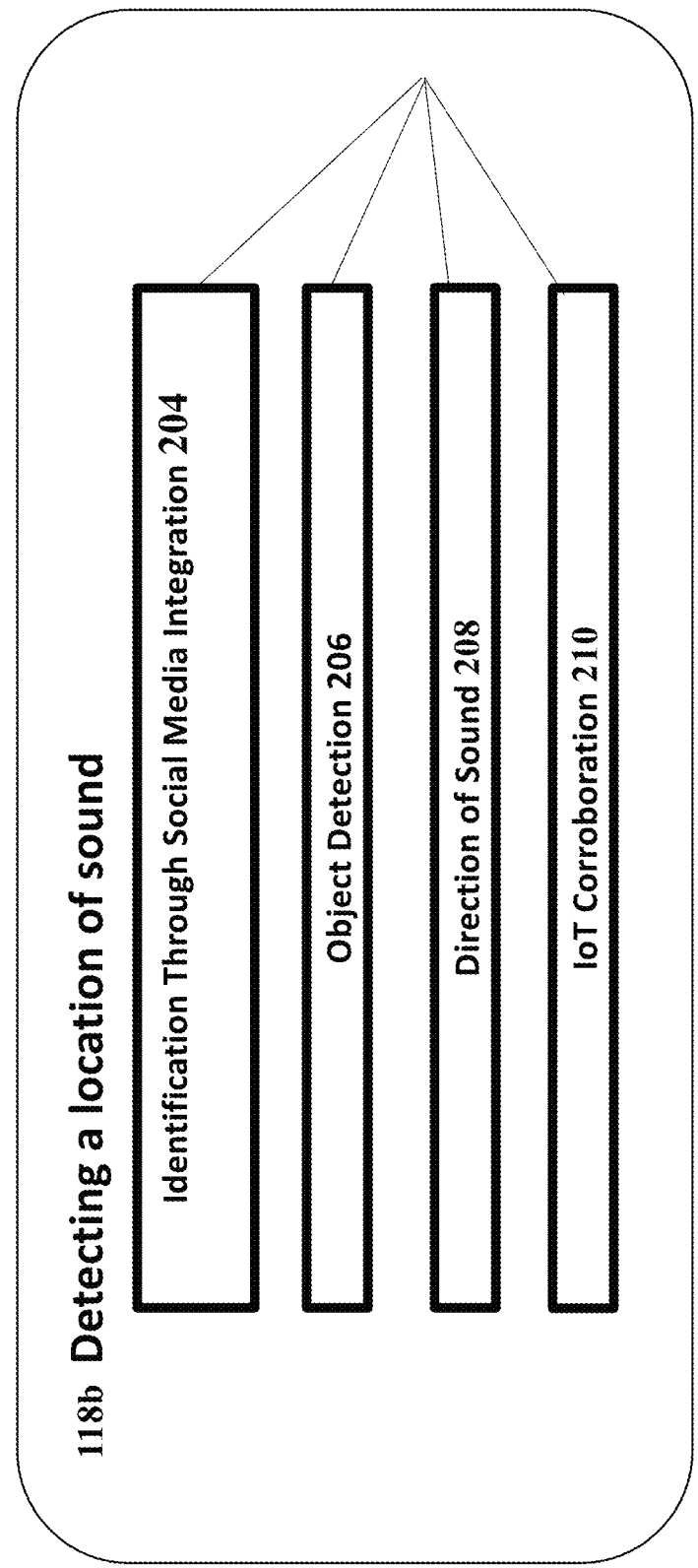
FIG. 5 illustrates the detecting of a location of sound by the system of FIG. 3.

FIG. 5 illustrates the detecting of a location of sound by the system 100 at point 118 of FIG. 3. Referring to FIGS. 5, 2 and 3, detecting a location of sound 118*b* is as follows. The AR glass 46 will also recognize the sound and who (e.g., users 10, 12, 14, 16, etc.) is making the sound.

Identification can be made through Social Media Integration 204. If the users (e.g., users 10, 12, 14 and 16) are identified as "friends" on social media platforms or through a user's contact list then they can be identified that way.

Object detection 206 of a human in space can be performed by the AR system 40 to identify who (e.g., user 10, 12, 14, 16, etc.) to tag the sound to.

Direction of Sound 208 can be approximated by which direction the sound wave contains the highest amplitude.

IoT Corroboration 210 is as follows. Other, microphone enhanced, paired IoT devices 50 can help triangulate the location of the command. IoT devices 50 can include those that exist in the Social Media Integration 204 (i.e. devices of "friends" on the same network can be leveraged to identify location).

Combining these parameters 204, 206, 208, and 210 will pinpoint, who said what command.

Referring back to FIG. 3, however, the non-commands are ignored 120 in the second section 122. Ignoring arbitrary sounds includes sounds that are not detected to be commands will be ignored. This can include, but is not limited to faint noises, or other type of noise, etc.

The commands are then displayed on an AR screen in the AR system 40 and the primary user 10 selects the final command 124.

Figure 6:
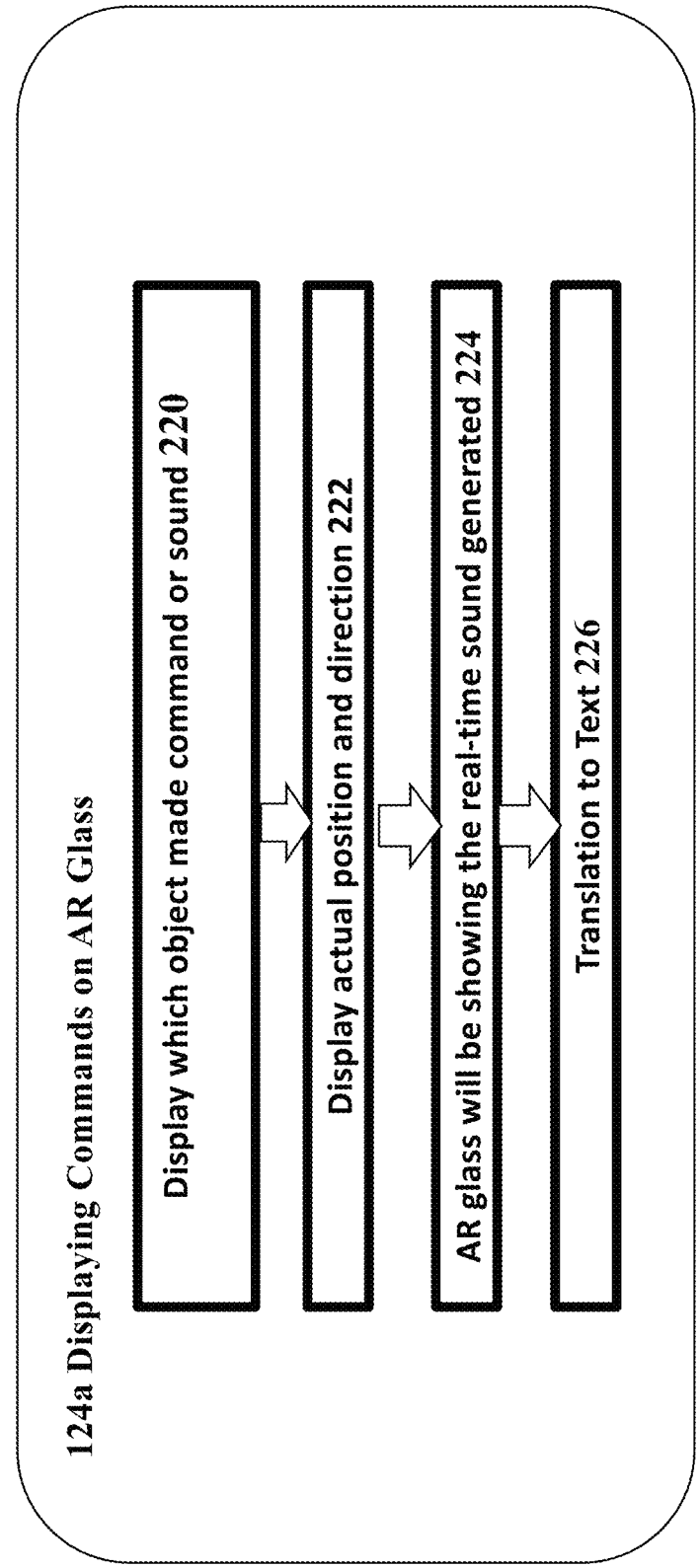
FIG. 6 illustrate Displaying Commands on AR Glass of FIG. 3.

FIG. 6 illustrate Displaying Commands on AR Glass 124*a* of FIG. 3. The detected commands will be displayed on the AR glass 46.

Which object made the specific command or sound will be displayed 220 on the AR glass 46.

The AR glass 46 will be showing the actual position and direction of the surrounding sounds along with the voice command in the AR surrounding 222.

While the voice command is being submitting, the AR glass will be showing the real-time sound generated from the surrounding and will be showing in the AR glass 224. User can also visualize his voice command translated to text in the AR glass and the sound generated from the surrounding 226.

Figure 7:
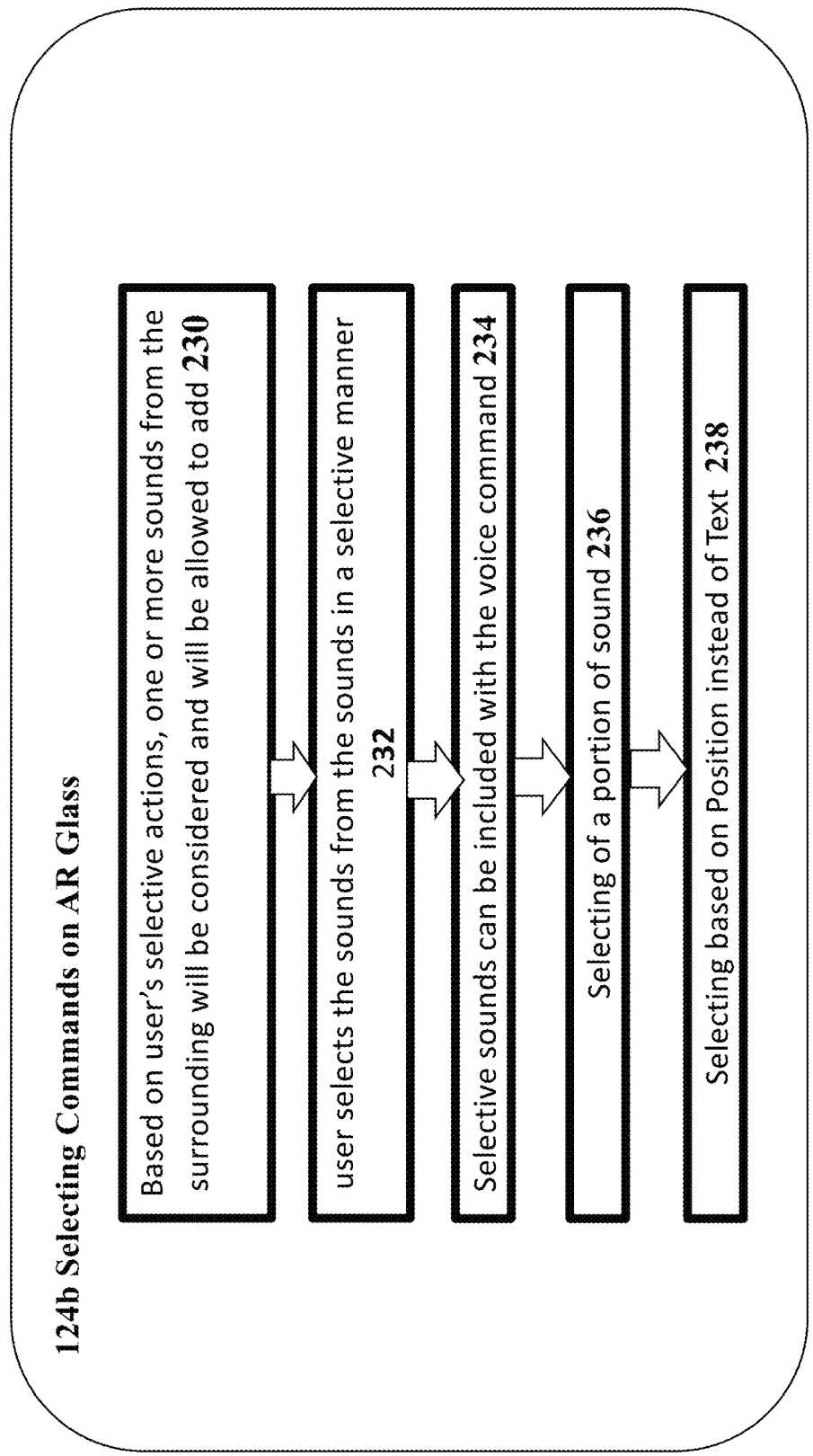
FIG. 7 illustrates Selecting Commands on AR Glass in an embodiment of the present invention of FIG. 3.

FIG. 7 illustrates Selecting Commands on AR Glass 124*b* in an embodiment of the present invention of FIG. 3.

The user 10 can use finger gesture, eye contact, voice command, or facial expression with any of the surrounding sounds for allowing those sounds to be included in the voice command. Based on user's selective actions, one or more sounds from the surrounding will be considered and will be allowed to add those sounds with the original voice command 230.

The user 10 can select the sounds from the sounds in a selective manner, and accordingly add those sounds with the voice command the user 10 has submitted 232.

The selective sounds can be included with the voice command, and the said voice command can be included while the voice command is being submitted by the user, or after the voice command is submitted 234.

The selecting of a portion of sound 236 is as follows. While selecting one or more sounds from the surrounding in a selective manner user can select a portion of voice from any source in the surrounding and accordingly be adding those sound original voice command 236.

The selecting based on position instead of text 238 is as follows. While selecting any sound from the surrounding, the user 10 can select the position of the original voice command where the sounds are to be added with the voice command 238.

Figure 8:
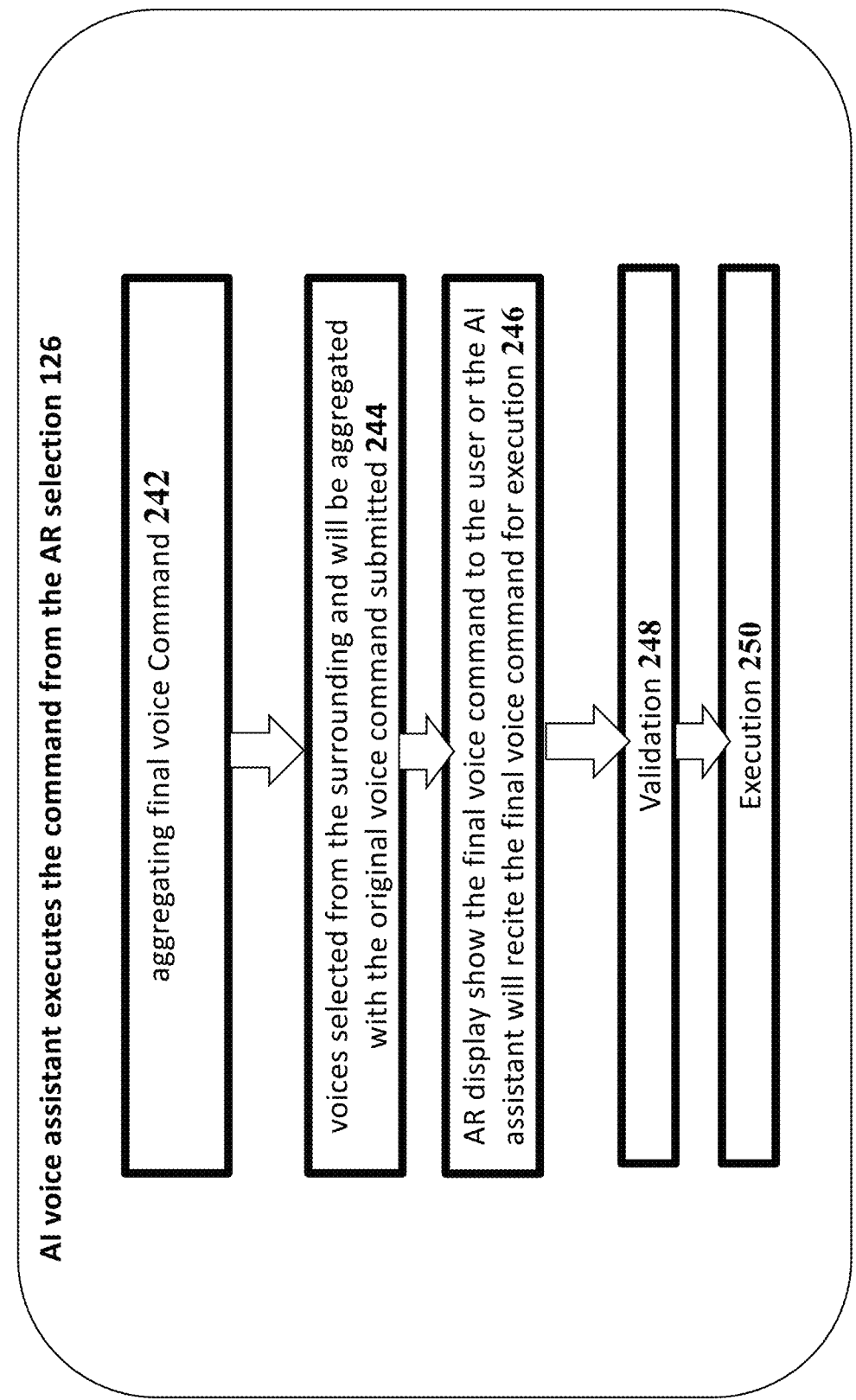
FIG. 8 illustrates AI voice assistant executes the command from the AR selection of FIG. 3.

FIG. 8 illustrates AI voice assistant executes the command from the AR selection of FIG. 3.

Referring to FIGS. 2, 3 and 8, then, the AI voice assistant executes the command from the AR selection 126. The aggregating final voice Command and execution 242 is as follows. The proposed system 100 will be aggregating the voices selected from the surrounding and will be aggregated with the original voice command submitted 244 by the user 10. The AR display from the AR system 40 will show the final voice command to the user 10 or the AI assistant 30 will recite the final voice command for execution 246. Then the system 100, after validation 248, the voice command is executed 250.

Figure 9:
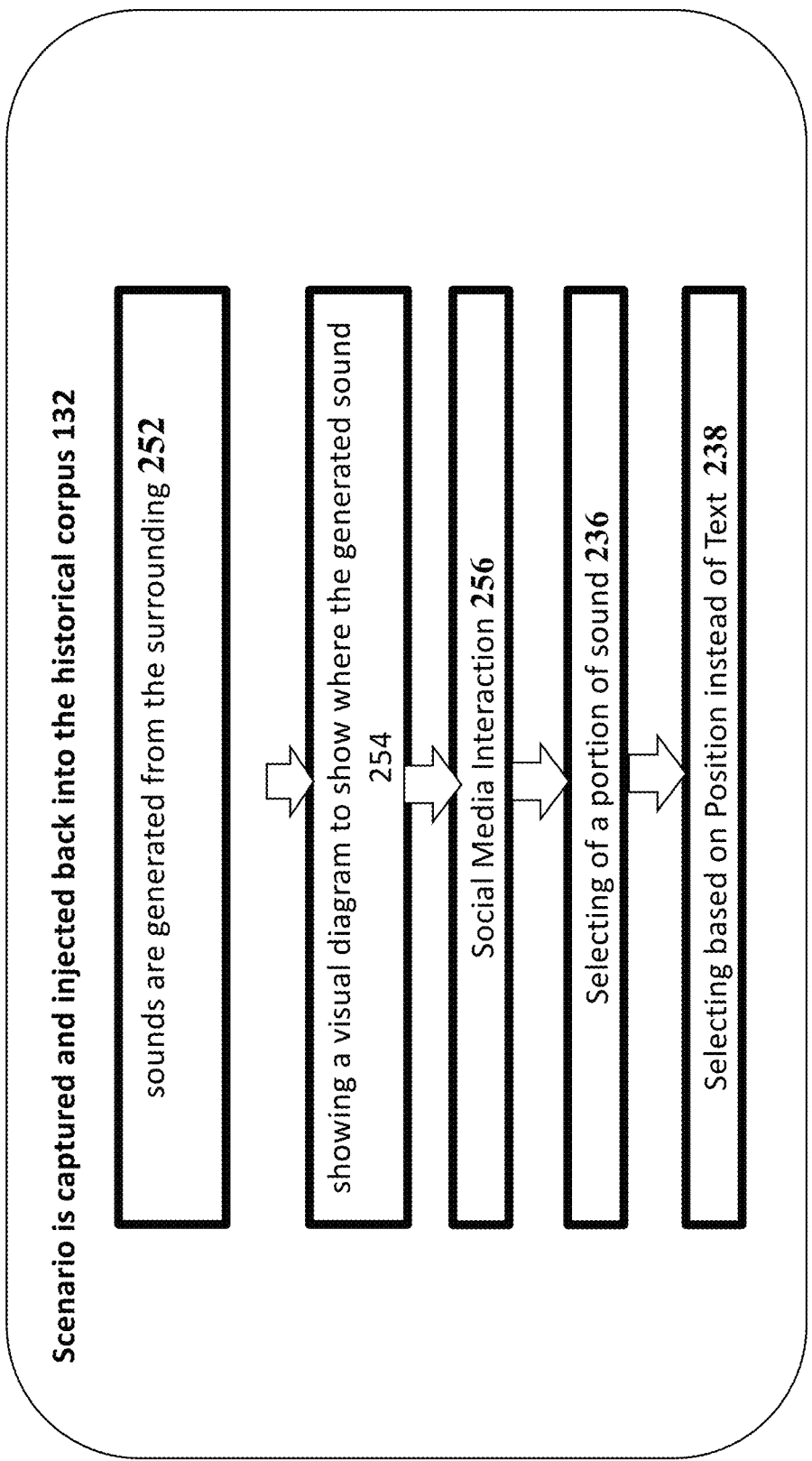
FIG. 9 illustrates Feedback Loop to Historical Corpus of FIG. 3.

FIG. 9 illustrates Feedback Loop to Historical Corpus of FIG. 3.

Referring to FIGS. 2, 3 and 9, then the scenario is captured and injected back into the historical corpus 132. The Feedback Loop to Historical Corpus is as follows. Historically the AI voice assistance system 30 and AR glass 46 will be learning how the surrounding sounds are contextually related to the voice command submitted and will be identifying which sound are appropriate and can be added.

While submitting voice command, if any one or more sounds are generated from the surrounding the proposed system 100 will be which sounds should be included with the voice command 252.

Based in historical learning the proposed system will be showing a visual diagram to show where the generated sound is to be included in the voice command, so the user will be having understanding where the sound is to be added 254.

The Social Media Interaction 256 is as follows. If a secondary user 12, 14, or 16 says a lot of useful command add-ons then they will be more likely to get added as the primary user does a voice command and vice versa (if a secondary user adds many not useful commands then they will not be added to the voice commands moving forward) 256.

Referring back to FIG. 3, the historical corpus 130 is build based on user entry and user interaction with the system 100 from path 134 and the captured scenario 132.

An additional embodiment can include a Family Member Mode. The Family member voices would be recognized and would have a lower threshold for passing a voice command. Alternatively, also the Voice Assistant 30 can be built into the AR system 40.

Referring back to FIG. 2 use case in manufacturing can be as follows. If someone is working in a manufacturing plant and is equipped with an AR system 40, various commands are said as to what work needs to be done. Those commands appear on the screen and the user can choose which commands are the ones that need to be followed and which ones are just background noise. The module of the AR system 40 would aggregate those commands into one and provide that as the final command for the user 10.

Figure 10:
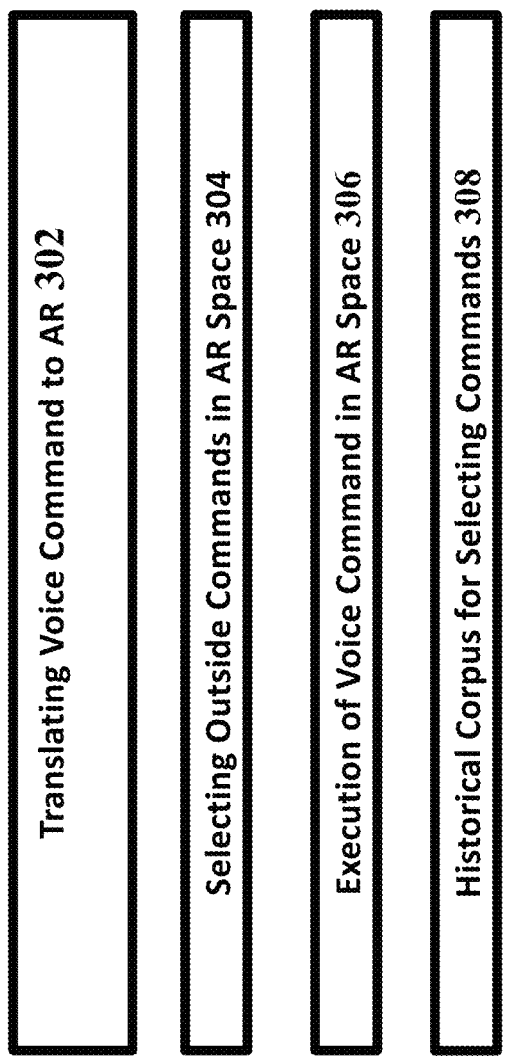
FIG. 10 illustrates a high-level diagram summary of an embodiment of the present invention.

FIG. 10 illustrates a high-level diagram summary an embodiment of the present invention.

A summary of some of the features of the present invention is as follows. First, there is the translating of voice commands to an AR system 40 in step 302 by the system 100. While submitting any voice command, the AI voice assistance system 40 will recognize individual sounds based on voice signature. Accordingly, it will identify which commands come from the user 10, 12, 14, 16 and which are generated from the surrounding. Furthermore, the submitted voice commands will be displayed on the Augmented Reality glass 46 for selective inclusion of one or more sounds in the original voice command.

Then, the system 100 selects outside commands in AR Space 304. While submitting voice command or after submitting voice command, the user 10 can selectively include one or more spoken content visualized in the Augmented reality system 40, and accordingly be same will be considered in the Voice command and will be executed.

Then, the system 100 provides execution of Voice Command in an AR Space 306. While submitting any voice command by any user 10, 12, 14, 16, the Augmented reality glass 46 will be showing real-time sound generation from the surrounding, and accordingly based on finger, facial and eye contact interaction the user 10 can selectively include one or more sound in the voice command, and accordingly the AI voice assistance system 40 will be executing the complete voice command.

A user 10 can select complete or partial spoken content from any source of sound while submitting any voice command and accordingly the selected portion of sound will be included with the voice command and complete voice command will be executing. While selectively including one or more sounds from the surrounding along with the voice command, the user can select a position on the voice command where the external sounds can selectively be included to complete the voice command.

Then, the system 100 provides an Historical Corpus for selecting commands 308. Using historical learning about selective inclusion of one or more sounds with the submitted voice command, the proposed system 100 will be recommending which sounds should be included with the voice command and will also be showing visual diagram to recommend where the sound should be added with the original voice command.

The following FIGS. 11 through 15 provide additional hardware configurations that can be implemented. Different features shown in different figures from FIGS. 1 through 15 can be combined, changed or switched between the different examples.

Figure 11:
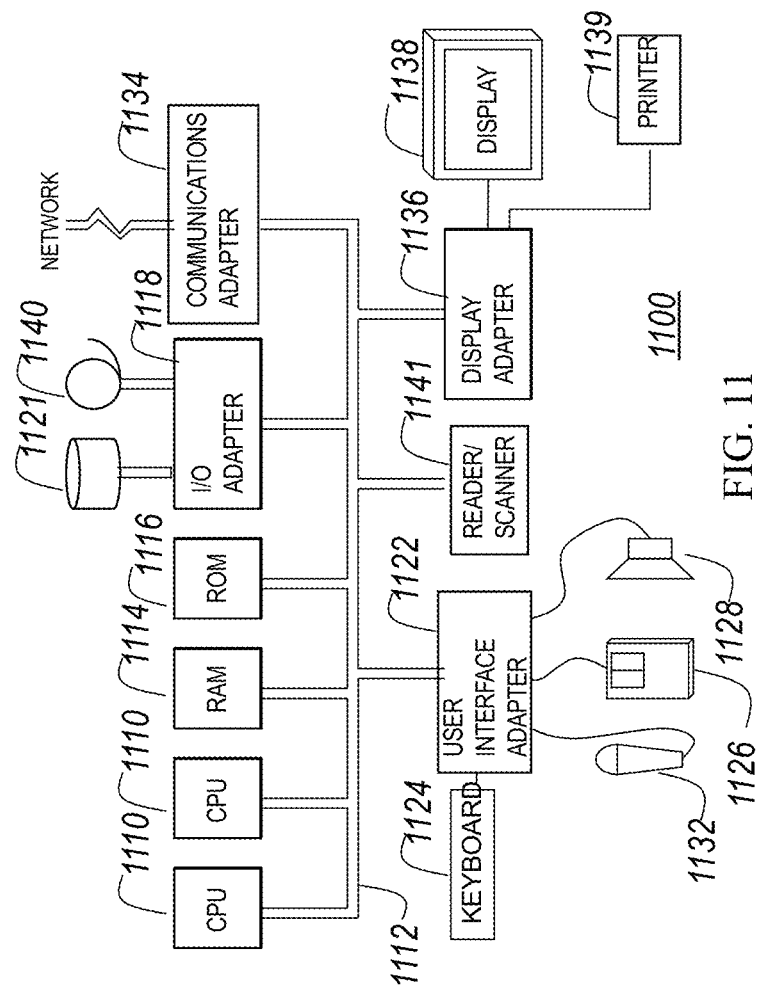
FIG. 11 illustrates an exemplary hardware/information handling system for incorporating the example embodiment of the present invention therein.

FIG. 11 illustrates another hardware configuration of the system 100, where there is an information handling/computer system 1100 in accordance with the present invention and which preferably has at least one processor or central processing unit (CPU) 1110 that can implement the techniques of the invention.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 12), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
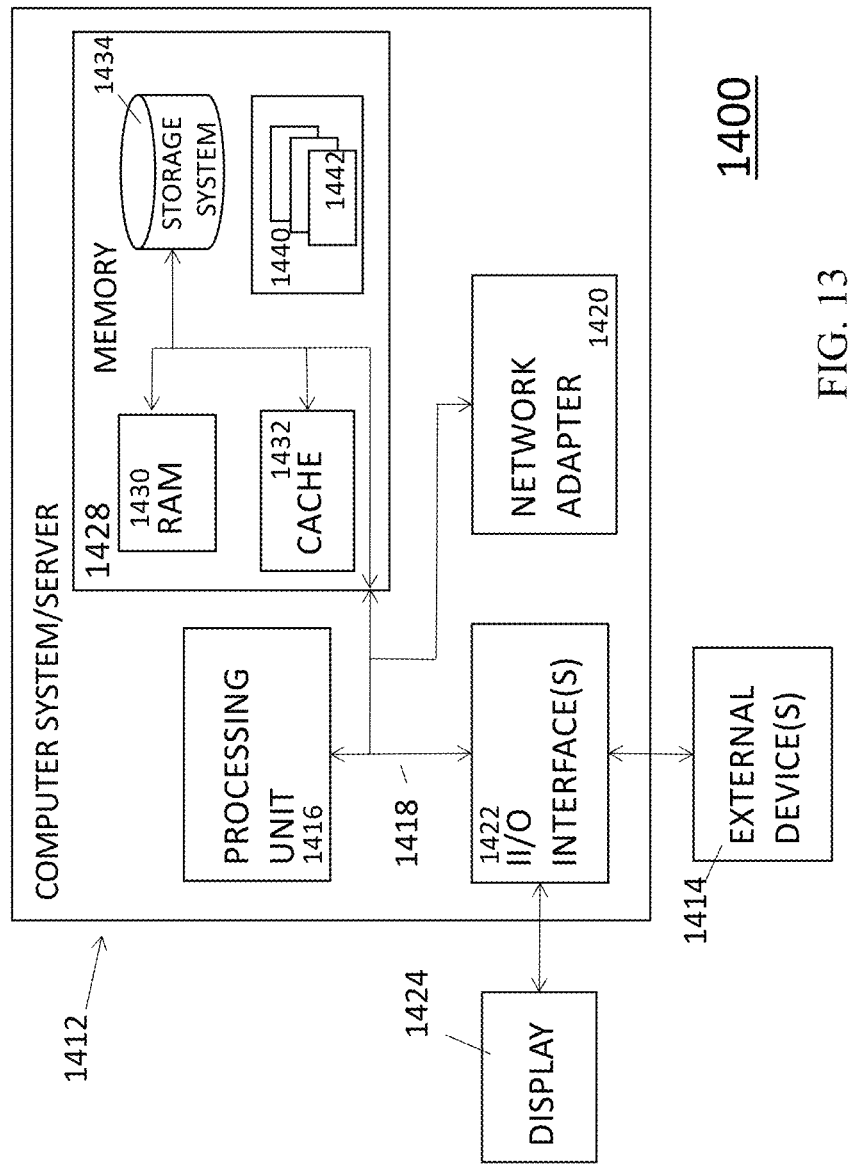
FIG. 13 depicts a cloud computing node according to an example embodiment of the present invention.

Referring now to FIG. 13, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to microcode, device drivers, redundant processing units, external disk drive arrays, RAID systems, tape drives, and data archival storage systems, etc.

Figure 14:
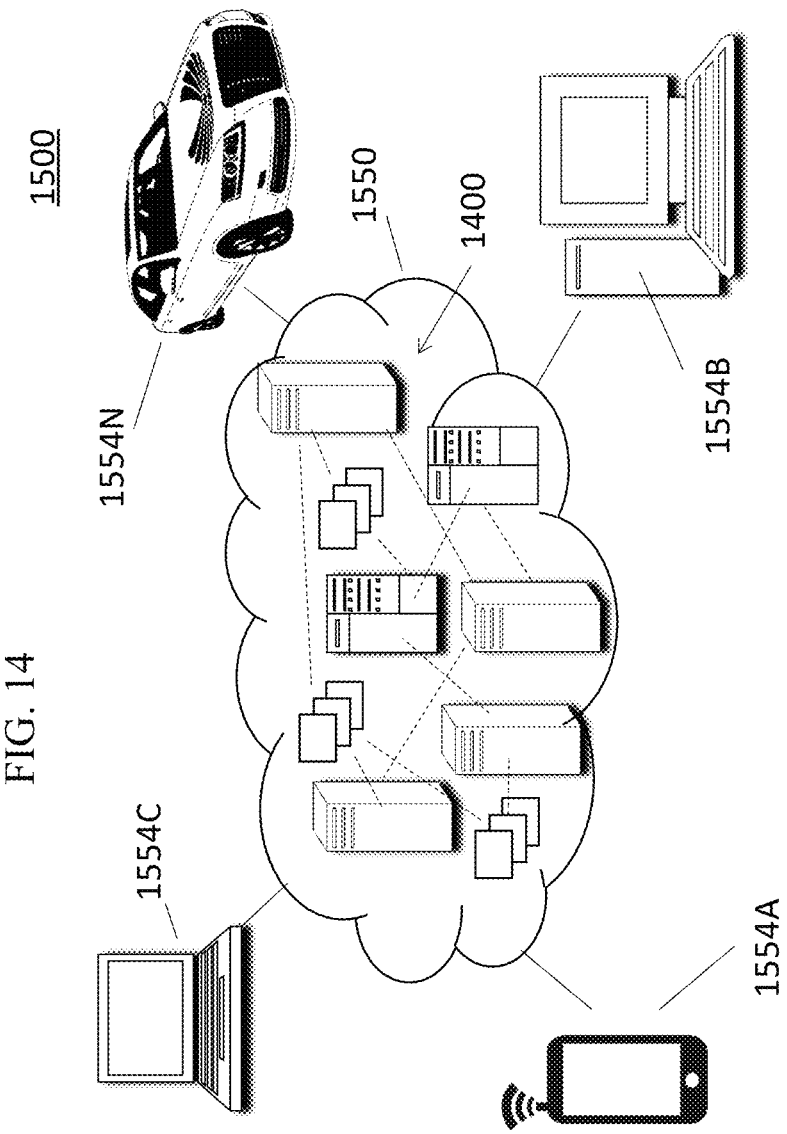
FIG. 14 depicts a cloud computing environment according to an example embodiment of the present invention.

Referring now to FIG. 14, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 14 are intended to be illustrative only and that computing nodes 1400 and cloud computing environment 1550 can communicate with any type of computerized device over any type of network and/or network addressable connection (e.g., using a web browser).

Figure 15:
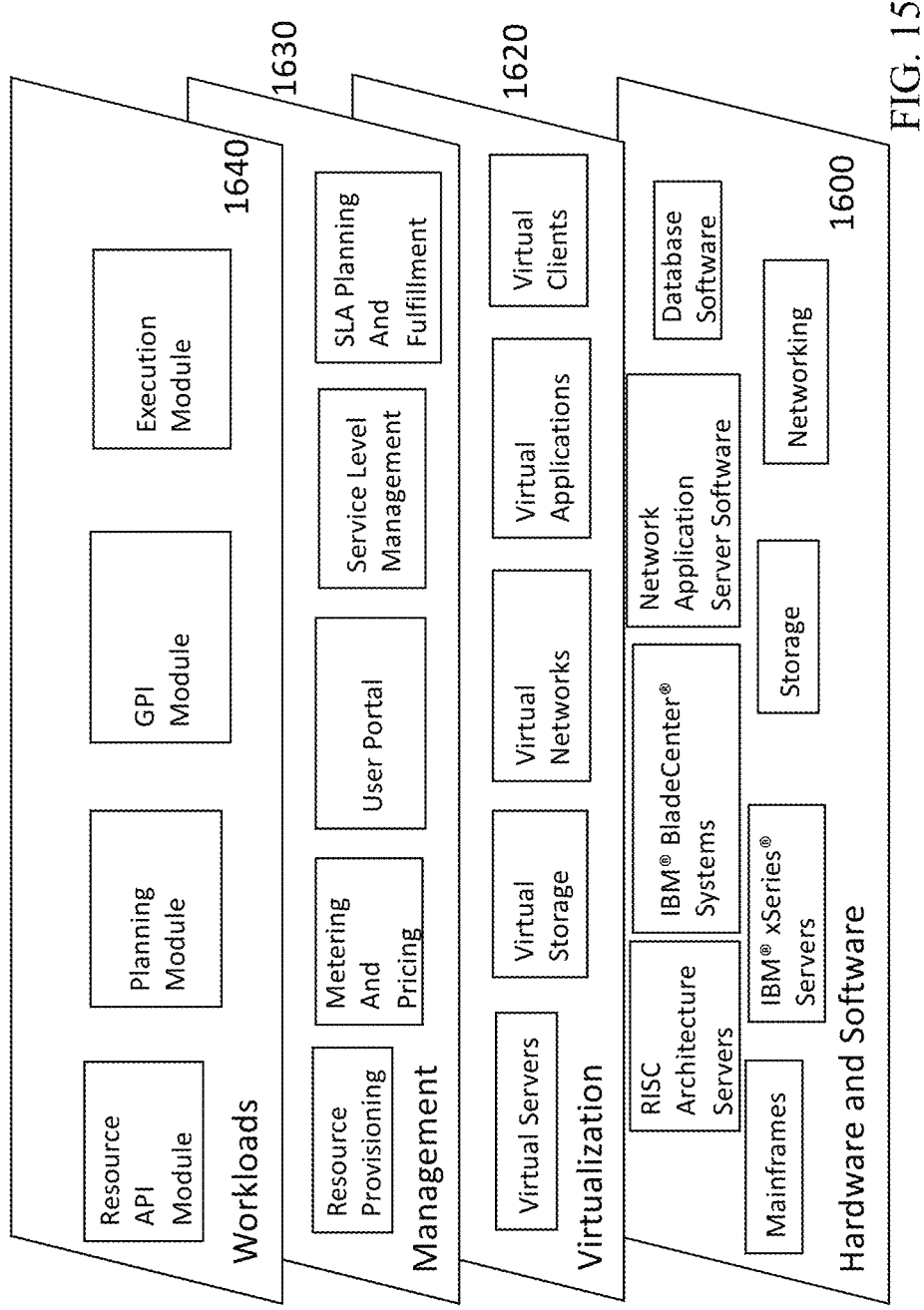
FIG. 15 depicts abstraction model layers according to an example embodiment of the present invention.

Referring now to FIG. 15, a set of functional abstraction layers provided by cloud computing environment 1550 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1660 include hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method to generate an augmented voice command, comprising:
   identifying a voice command from a primary user;
   identifying sounds from one or more other users via one or more transducers;
   generating a visualization of the sounds for an augmented reality device, wherein one or more of the sounds can be selected using the visualization; and
   generating the augmented voice command wherein the augmented voice command comprises the voice command from the primary user and the one or more sounds selected using the visualization of the augmented reality device, and
   wherein the one or more sounds from the one or more users include additional suggestions to the voice command from the primary user.

2. The method of claim 1, further comprising:
   automatically selecting the one or more sounds based on a selection and de-selection history of historical sounds.

3. The method of claim 1,
   wherein the sounds include spoken et and non-spoken content.

4. The method of claim 1, further comprising:
   recognizing the primary user based on a voice signature in a surrounding environment from among a plurality of voice sounds.

5. The method according to claim 1, further comprising translating the voice command from the primary user to text and including the voice command in the visualization of the sounds.

6. The method according to claim 1, further comprising executing the augmented voice command.

7. The method according to claim 1, wherein the method is performed in a cloud infrastructure.

8. A system to generate an augmented voice command, comprising:
   a memory storing computer instructions; and
   a processor configured to execute the computer instructions to:
      identify a voice command from a primary user;
      identify sounds from one or more other users via one or more transducers to a smart speaker device;
      generate a visualization of the sounds for an augmented reality device,
   wherein one or more of the sounds can be selected using the visualization; and
      generate the augmented voice command,
      wherein the augmented voice command comprises the voice command from the primary user and the one or more sounds selected using the visualization of the augmented reality device, and
      wherein the one or more sounds from the one or more users include additional suggestions to the voice command from the primary user.

9. The system according to claim 8, further comprising automatically selecting the one or more sounds based on a selection and de-selection history of historical sounds.

10. The system according to claim 8,
    wherein the sounds include spoken and non-spoken content.

11. The system according to claim 8, further comprising selecting the one or more sounds based on a selection and de-selection history of historical information stored in the memory,
    wherein the sounds include spoken and non-spoken content.

12. The system according to claim 8, further comprising translating the voice command from the primary user to text and including the voice command in the visualization of the sounds.

13. The system according to claim 8, further comprising: executing the augmented voice command.

14. A computer program product comprising a computer readable storage medium having program instructions embodied therewith, the program instructions readable and executable by a computer to cause the computer to perform a method, comprising:
- identifying a voice command from a primary user;
- identifying sounds from one or more other users via one or more transducers;
- generating a visualization of the sounds for an augmented reality device, wherein one or more of the sounds can be selected using the visualization; and
- generating an augmented voice command, wherein the augmented voice command comprises the voice command from the primary user and the one or more sounds selected using the visualization of the augmented reality device, and
- wherein the one or more sounds from the one or more users include additional suggestions to the voice command from the primary user.

15. The computer program product according to claim 14, wherein the method further comprises automatically selecting at least the one or more sounds based on a selection and de-selection history of historical sounds.

16. The computer program product according to claim 14, wherein the sounds include spoken and non-spoken content.

17. The computer program product according to claim 14, wherein the method further comprises selecting the one or more sounds based on a selection and de-selection history of historical information stored in a memory.

18. The computer program product according to claim 14, wherein the method further comprises translating the voice command from the primary user to text and including the voice command in the visualization of the sounds.

19. The computer program product according to claim 14, wherein the method further comprises:
executing the augmented voice command.

\* \* \* \* \*